US008809215B2

(12) United States Patent
Van De Loosdrecht et al.

(10) Patent No.: US 8,809,215 B2
(45) Date of Patent: Aug. 19, 2014

(54) CATALYSTS

(75) Inventors: Jan Van De Loosdrecht, Sasolburg (ZA); Abdool Muthalib Saib, Vanderbijlpark (ZA)

(73) Assignee: Sasol Technology (Proprietary) Limited (ZA)

( * ) Notice: Subject to any disclaimer, the term of this patent is extended or adjusted under 35 U.S.C. 154(b) by 679 days.

(21) Appl. No.: 12/599,107

(22) PCT Filed: May 9, 2008

(86) PCT No.: PCT/IB2008/051862
§ 371 (c)(1),
(2), (4) Date: Nov. 6, 2009

(87) PCT Pub. No.: WO2008/139407
PCT Pub. Date: Nov. 20, 2008

(65) Prior Publication Data
US 2010/0304955 A1      Dec. 2, 2010

Related U.S. Application Data

(60) Provisional application No. 60/917,356, filed on May 11, 2007.

(51) Int. Cl.
| | |
|---|---|
| *B01J 38/48* | (2006.01) |
| *B01J 38/00* | (2006.01) |
| *B01J 38/10* | (2006.01) |
| *B01J 23/96* | (2006.01) |
| *B01J 23/89* | (2006.01) |
| *B01J 37/02* | (2006.01) |
| *C10G 2/00* | (2006.01) |
| *B01J 23/94* | (2006.01) |
| *B01J 38/30* | (2006.01) |
| *B01J 21/12* | (2006.01) |

(52) U.S. Cl.
CPC ............... *C10G 2/332* (2013.01); *B01J 23/96* (2013.01); *C10G 2300/705* (2013.01); *B01J 23/8913* (2013.01); *B01J 37/0209* (2013.01); *C10G 2/30* (2013.01); *B01J 38/48* (2013.01); *B01J 23/94* (2013.01); *B01J 38/30* (2013.01); *B01J 21/12* (2013.01); *B01J 38/10* (2013.01)
USPC ................................. 502/22; 502/20; 502/53

(58) Field of Classification Search
None
See application file for complete search history.

(56) References Cited

U.S. PATENT DOCUMENTS

| | | | |
|---|---|---|---|
| 5,733,839 A | 3/1998 | Espinoza et al. | |
| 6,455,462 B2 | 9/2002 | Van Berge et al. | |
| 6,753,286 B2 * | 6/2004 | Clark et al. | 502/28 |
| 6,812,179 B2 | 11/2004 | Huang et al. | |
| 6,838,487 B1 * | 1/2005 | Demirel et al. | 518/709 |
| 2002/0183403 A1 * | 12/2002 | Huang et al. | 518/709 |
| 2003/0125201 A1 | 7/2003 | Van Berge et al. | |
| 2003/0144131 A1 | 7/2003 | Koveal et al. | |
| 2005/0227866 A1 | 10/2005 | Berge et al. | |

FOREIGN PATENT DOCUMENTS

| | | |
|---|---|---|
| EP | 0 736 326 A1 | 10/1996 |
| EP | 1 058 580 | 2/2004 |
| GB | 2 222 531 | 3/1990 |
| WO | 9942214 | 8/1999 |
| WO | 0020116 | 4/2000 |
| WO | 0139882 A1 | 6/2001 |
| WO | 0207883 A2 | 1/2002 |
| WO | 03012008 A2 | 2/2003 |
| WO | 03035257 A1 | 5/2003 |
| WO | WO 2006075216 A1 | 7/2006 |
| WO | PCTIB2008051723 | 11/2008 |
| ZA | 9510296 | 6/1996 |

OTHER PUBLICATIONS

European Patent Office PCT International Preliminary Report on Patentability, International Application PCT IB2008/051862, mailed Nov. 17, 2009.
European Patent Office PCT International Search Report, International Application PCT/IB2008/051862, mailed Jan. 20, 2009.
European Patent Office PCT Written Opinion of the ISA, International Application PCT/IB2008/051862, malied Jan. 20, 2009.

* cited by examiner

*Primary Examiner* — Melvin Curtis Mayes
*Assistant Examiner* — Stefanie Cohen
(74) *Attorney, Agent, or Firm* — Fellers, Snider, Blankenship, Bailey & Tippens, PC

(57) ABSTRACT

A process for regenerating a spent cobalt Fischer-Tropsch synthesis catalyst includes subjecting a spent particulate cobalt Fischer-Tropsch synthesis catalyst sequentially to a dewaxing treatment, an oxidation treatment at a pressure of 4 to 30 bar(a) and a reduction treatment, thereby regenerating the catalyst.

12 Claims, No Drawings

CATALYSTS

THIS INVENTION relates to cobalt catalysts. It relates in particular to a process for regenerating a spent cobalt Fischer-Tropsch synthesis catalyst.

When cobalt Fischer-Tropsch synthesis catalysts are used in Fischer-Tropsch synthesis, they lose activity, so that the catalysts thus become spent. The Applicant has now surprisingly found that it is possible to recover catalyst activity, by using the process of the invention.

Thus, according to the invention, there is provided a process for regenerating a spent cobalt Fischer-Tropsch synthesis catalyst, which process includes subjecting a spent particulate cobalt Fischer-Tropsch synthesis catalyst sequentially to a dewaxing treatment, an oxidation treatment at a pressure of 4 to 30 bar(a) and a reduction treatment, thereby regenerating the catalyst.

By 'bar(a)' is meant a pressure value measured in bar and expressed on an absolute scale, rather than on a gauge scale, which would thus be expressed as 'bar(g)'.

If necessary, ie if further regeneration of the catalyst is required, the process may include subjecting the catalyst to at least one further regeneration cycle comprising an oxidation treatment at a pressure of 4 to 30 bar(a) followed by a reduction treatment. The oxidation treatment and the reduction treatment during the further regeneration cycle may be similar to those which the spent catalyst is initially subjected.

The dewaxing treatment may include hydrogenolysis; solvent wash or extraction; or solvent wash or extraction followed by hydrogenolysis. Thus, for example, the dewaxing treatment may include subjecting the spent catalyst to wax extraction using a suitable solvent, such as hexane or xylene, before subjecting it to hydrogenolysis using hydrogen.

After dewaxing, the catalyst is in the form of a dry powder and typically contains between 5 and 20 m % residual carbon/wax. This residual carbon/wax needs to be removed in the oxidation step.

After the dewaxing treatment and before the oxidation treatment, the process may include passivating the catalyst. This can, for example, be done by means of $CO_2$ or diluted oxygen. Passivation is oxidizing the outer cobalt layer to make the material safe to handle. If the cobalt catalyst can be transported safely from a dewaxing stage in which the dewaxing treatment is carried out into an oxidation stage in which the oxidation treatment is carried out, then the passivation treatment is not required.

The oxidation treatment may comprise subjecting the dewaxed catalyst particles to calcination by fluidizing the catalyst particles in an oxygen containing gas at an elevated temperature and at the elevated pressure of from 4 to 30 bar(a), thereby to oxidize the catalyst particles. More particularly, the fluidization of the dewaxed catalyst particles may be effected in a reaction chamber which is at the elevated pressure, with the calcination including heating the catalyst particles up to a temperature T and holding the catalyst particles at the temperature T for a period of time.

The space velocity through the reaction chamber during the fluidization may be in the range of 100 to 20000 $ml_n$/g catalyst/hour. Typically, the space velocity may be about 1000 to about 3000 $ml_n$/g catalyst/hour. The air space velocity may be constant during the oxidation treatment.

The catalyst particles may be heated up to the temperature T at a rate of 0.1 to 10° C./min. Typically, the catalyst particles may be heated up at a rate of about 0.5 to about 3° C./min.

The temperature T to which the catalyst particles are heated up during the calcination may be in the range of 150° C. to 400° C. Typically, T may be about 250° C. to about 350° C.

The period of time that the catalyst particles are held at the temperature T, may be in the range of 0.1 hour to 24 hours. Typically, the period of time that the catalyst particles are held at T, may be about 0.1 to about 12 hours.

Thus, the process may include subjecting the dewaxed catalyst particles to fluidization in a reaction chamber at the elevated pressure, using a constant space velocity of 100 to 20000 $ml_n$/g catalyst/hour, while heating the catalyst particles at a rate of 0.1 to 10° C./min, up to a temperature of 150° C. to 400° C., and holding the catalyst particles at this temperature for 0.1 hour to 24 hours.

More preferably, the elevated pressure at which the oxidation is effected may be 4 to 12 bar(a). 1 Bar is equivalent to 100 kPa or $kN/m^2$.

The pressure at which the oxidation is effected may start at atmospheric pressure and be increased during the oxidation step to the preferred elevated pressure of 4-30 bar(a), preferably 4-12 bar(a).

The oxidation can be performed in air, ie in a gas phase containing 21% oxygen, or in diluted air, eg containing 0.1% to 21% oxygen. The oxygen level can also be varied during the oxidation procedure, starting at a low oxygen concentration, eg about 1%, and increasing it gradually to about 21%.

The reduction treatment may, in principle, comprise any reduction procedure known in the art. Thus, the reduction treatment may comprise treating the oxidized catalyst particles with a hydrogen-containing reducing gas at an elevated temperature and at a pressure P where $P \geq 0.8$ bar(a), ie at atmospheric or elevated pressure.

In one embodiment of the invention, the reduction treatment may include in a first activation stage, treating the oxidized catalyst particles with a hydrogen-containing reducing gas or a nitrogen-containing gas, at a first heating rate, HR1, until the particles have reached a temperature, $T_1$, where 80° C.$\leq T_1 \leq$180° C., to obtain a partially treated catalyst precursor;

in a second activation stage, treating the partially treated catalyst precursor with a hydrogen-containing reducing gas, at a second heating rate, HR2, where $0 \leq HR2 < HR1$, for a time, $t_1$, where $t_1$ is from 0.1 to 20 hours, to obtain a partially reduced catalyst precursor; and thereafter in a third activation stage, treating the partially reduced catalyst precursor with a hydrogen-containing reducing gas, at a third heating rate, HR3, where HR3>>HR2 until the partially reduced catalyst precursor reaches a temperature, $T_2$, and maintaining the partially reduced catalyst precursor at $T_2$ for a time, $t_2$, where $t_2$ is from 0 to 20 hours, to obtain an activated supported cobalt-based Fischer-Tropsch synthesis catalyst, ie a regenerated catalyst.

The treatments in the first, second and third activation stages may be effected by using a fluidized bed of the catalyst particles.

The first activation stage commences when the oxidized catalyst particles are first subjected to treatment with the hydrogen-containing reducing gas or the nitrogen-containing gas with the immediate application of the first heating rate HR1. The gas in the first activation stage will have a gas space velocity, SV1. Preferably, $1 \leq SV1 \leq 35$ $m^3_n$/kg red. Co/h; more preferably, $3 \leq SV1 \leq 15$ $m^3_n$/kg red. Co/h. By 'red.Co' or 'reducible cobalt' is meant the cobalt that can be reduced during normal reduction, eg if the catalyst contains 20 mass % cobalt and 50% of the cobalt can be reduced, then the amount of reducible cobalt is 0.1 g/g catalyst. The first activation stage continues until the catalyst particles attain the temperature $T_1$.

Preferably, 0.5° C./min≤HR1≤10° C./min; more preferably, 1° C./min≤HR1≤2° C./min.

The second activation stage thus commences when the catalyst particles have attained the temperature $T_1$, and endures for the time $t_1$ as hereinbefore described. As regards the second activation stage treatment time $t_1$, more preferably 1≤$t_1$≤10 hours, typically 2≤$t_1$≤6 hours.

In one embodiment of the invention, in the second activation stage, the catalyst particles may be maintained at the temperature $T_1$, ie HR2=0. Thus, the temperature $T_1$ then constitutes a holding temperature at which the catalyst particles are held for the treatment time $t_1$.

However, in another embodiment of the invention, in the second activation stage, the catalyst particles may be heated from the temperature $T_1$ to a temperature $T_H$ where $T_H$>$T_1$, ie HR2>0, and $T_H$<200° C. The catalyst particles can, if desired, be held for some time at the temperature $T_1$ before commencing heating thereof to the temperature $T_H$.

In the second activation stage, preferably 0.05° C./min≤HR2≤0.5° C./min; more preferably 0.1° C./min≤HR2≤0.2° C./min.

The third activation stage commences once the time $t_1$ has elapsed. The catalyst particles thus, at the commencement of the third activation stage and in one embodiment of the invention, will still be at the temperature $T_1$, ie at a temperature between 80° C. and 180° C. However, in another embodiment of the invention, the catalyst particles will, at the commencement of the third activation stage, be at the higher temperature, $T_H$. The third activation stage treatment is thus continued until the temperature in the third treatment stage, ie the temperature of the activated Fischer-Tropsch catalyst, reaches $T_2$. Preferably, 300° C.≤$T_2$≤600° C. More preferably, $T_2$ may be in the range of 300° C. to 500° C., with a typical value of $T_2$ being in the range of 300° C. to 450° C. The catalyst can be maintained at $T_2$ for 0-20 hours (ie $t_2$), preferably 0<$t_2$≤20 hours, more preferably 1≤$t_2$≤10 hours, typically 2≤$t_2$≤6 hours.

The gas will also, in the second activation stage, have a space velocity, hereinafter referred to as SV2, and will also, in the third activation stage, have a space velocity, hereinafter referred to as SV3.

In one version of the invention, SV1, SV2 and/or SV3 may be constant during the treatments in their respective activation stages. For example, the relationship of the space velocities in the various stages may be SV1=SV2=SV3. However, in another version of the invention, SV1, SV2 and SV3 may vary during the respective activation stages.

In the first activation stage, a hydrogen-containing reducing gas is preferably used, and the gas used in the three activation stages may have the same composition. By 'hydrogen-containing reducing gas' is meant a hydrogen containing gas mixture comprising 10 vol %<$H_2$≤100 vol %, more preferably >90 vol % $H_2$ and <10 vol % inerts, most preferably >97 vol % $H_2$ and <3 vol % inerts. The inerts could be any combination of Ar, He, $NH_3$ and $H_2O$, with the preferred dew point of the hydrogen-containing reducing gas being ≤4° C., more preferably ≤−30° C.

In the first activation stage, a nitrogen-containing gas can instead be used. By 'nitrogen-containing gas' is meant a gas mixture comprising >90 vol % $N_2$ and <10 vol % other components, with the other components being any combination of Ar, He, and $H_2O$. The preferred dew point of the nitrogen-containing gas is ≤4° C., more preferably ≤−30° C. This nitrogen containing gas does not contain any hydrogen (ie hydrogen=0 vol %).

The treatments in the first, second and third activation stages may be effected at the same or different pressures, and may each be effected at about atmospheric pressure, preferably at between 0.6 and 1.3 bar(a).

Thus, the catalyst reduction in this embodiment of the invention may be effected in the manner described in PCT/IB2008/051723 which is hence incorporated herein by reference.

However, in another embodiment of the invention, the reduction treatment may include in a first activation stage, treating the oxidized catalyst particles and which contain reducible cobalt oxide in a calcined state and having a formula-unit in which each mole of cobalt atoms is associated with more than 4/3 moles of oxygen atoms and displaying a reducible cobalt oxide specific surface area at least equal to that of $CO_3O_4$ spinel, with a pure hydrogen reducing gas, at a first specific feed gas space velocity, SV1, and at a first heating rate, HR1, to obtain a partially reduced catalyst precursor; and thereafter treating the partially reduced catalyst precursor, in a second activation stage, with a pure hydrogen reducing gas, at a second specific feed gas space velocity, SV2, and at a second heating rate, HR2, to obtain an activated supported Fischer-Tropsch catalyst, where SV2≤ ≤SV1 and/or HR2≥2≥HR1, provided that when SV2=SV1, HR2≠HR1 and when HR2=HR1, SV2≠SV1.

Thus, the catalyst reduction, in this embodiment of the invention, may be effected in the manner described in WO 03/035257 which is hence incorporated herein by reference.

The cobalt Fischer-Tropsch synthesis catalyst may, in particular, be one that is obtained by forming a slurry of a particulate catalyst support, a cobalt compound as an active component precursor, and water; subjecting the catalyst support to impregnation with the cobalt compound; drying the impregnated catalyst support, calcining the impregnated support to obtain a catalyst precursor; and reducing the catalyst precursor, to obtain an active cobalt Fischer-Tropsch synthesis catalyst. Naturally, this catalyst is then used for Fischer-Tropsch synthesis and during such synthesis it thus becomes deactivated or spent, and then requires regeneration in accordance with the invention.

Any commercially available pre-shaped porous oxide catalyst support, such as alumina ($Al_2O_3$), silica ($SiO_2$), titania ($TiO_2$), magnesia (MgO), $SiO_2$—$Al_2O_3$ and zinc oxide (ZnO), may be used. The support preferably has an average pore diameter between 8 and 50 nanometers, more preferably between 10 and 15 nanometers. The support pore volume may be between 0.1 and 1.5 ml/g, preferably between 0.3 and 0.9 ml/g. The average particle size is preferably between 1 and 500 micrometers, more preferably between 10 and 250 micrometers, still more preferably between 45 and 200 micrometers.

The support may be a protected modified catalyst support, containing, for example, silicon as modifying component, as described in EP Application No. 99906328.2 (European Publication No. 1058580), which is hence incorporated herein by reference.

More specifically, the protected modified catalyst support may be that obtained by contacting a silicon precursor, eg an organic silicon compound such as tetra ethoxy silane ('TEOS') or tetra methoxy silane ('TMOS') with the catalyst support, eg by means of impregnation, precipitation or chemical vapour deposition, to obtain a silicon-containing modified catalyst support; and calcining the silicon-containing modified catalyst support, eg in a rotary calciner, at a temperature from 100° C. to 800° C., preferably from 450° C. to 550° C., and for a period of from 1 minute to 12 hours, preferably from 0.5 hour to 4 hours.

Instead, or additionally, the modified catalyst support may be that obtained by
introducing a multi-functional carboxylic acid having the general formula (I)

HOOC—C*R$_1$C*R$_2$—COOH    (1)

or a precursor thereof,
where
C* in each of C*R$_1$ and C*R$_2$ is a sp$^2$ carbon, and
R$_1$ and R$_2$ are the same or different, and are each selected from the group consisting in hydrogen, carbenium and alkyl, into and/or onto a particulate catalyst support, with the proportion of the multi-functional carboxylic acid relative to the support being from 0.3-4.4 µmol carboxylic acid/m$^2$ support;
optionally, drying the carboxylic acid containing catalyst support;
simultaneously with the introduction of the carboxylic acid into and/or onto the catalyst support, or subsequent thereto, impregnating the catalyst support with a cobalt salt, and, optionally, with a reduction promoter, and partially drying the impregnated support; and
calcining the partially dried impregnated support.

The cobalt loading can be between 5 g Co/100 g support and 70 g Co/100 g support, preferably between 20 g Co/100 g support and 55 g Co/100 g support.

The cobalt salt may, in particular, be cobalt nitrate, Co(NO$_3$)$_2$.6H$_2$O.

The impregnation of the catalyst support may, in principle, be effected by any known method or procedure such as incipient wetness impregnation or slurry impregnation. However, the impregnation may, in particular, be effected in the manner described in U.S. Pat. No. 6,455,462 or in U.S. Pat. No. 5,733,839, and which are thus incorporated herein by reference.

More specifically, impregnation may be effected by subjecting, at elevated temperature, a slurry comprising the particulate catalyst support, water and the cobalt salt to a sub-atmospheric pressure environment, which may be down to 5 kPa(a), preferably between atmospheric pressure and 20 kPa (a); drying the impregnated carrier at elevated temperature and under a sub-atmospheric pressure environment, which may be as hereinbefore described. Still more specifically, the impregnation may be effected by subjecting the slurry, in an initial treatment stage, to treatment at elevated temperature and under a sub-atmospheric pressure environment as hereinbefore described to impregnate the support with the cobalt salt and to dry the impregnated support partially, and thereafter, in a subsequent treatment stage, subjecting the partially dried impregnated support to treatment of elevated temperature and under a sub-atmospheric pressure environment as hereinbefore described, such that the temperature in the subsequent treatment stage exceeds that in the initial treatment stage and/or the sub-atmospheric pressure in the subsequent treatment stage is lower than that in the initial treatment stage, thereby to obtain more vigorous drying of the impregnated support in the subsequent treatment stage than in the initial treatment stage, to obtain a dried impregnated support.

The impregnation may include subjecting the support to two or more impregnation steps, to obtain a desired cobalt loading. Each impregnation step may then include an initial and a subsequent treatment stage as hereinbefore described.

The support impregnation may thus involve a 2-step slurry phase impregnation process, which is dependent on a desired cobalt loading requirement and the pore volume of the catalyst support.

The support impregnation and drying may typically be effected in a conical vacuum drier with a rotating screw or in a tumbling vacuum drier.

During the cobalt impregnation steps, a water soluble precursor salt of platinum (Pt), palladium (Pd), ruthenium (Ru), rhenium (Re) or mixtures thereof, may be added, as a dopant capable of enhancing the reducibility of the active component.

As also hereinbefore described, during the impregnation steps, an organic modifier, such as fumaric acid or maleic acid, may be added to enhance the catalyst activity.

Calcination of the impregnated and dried material may be done using any method, known to those skilled in the art, for example in a fluidized bed, or a rotary kiln, calciner at 200-400° C. It may, in particular, be effected as described in WO 01/39882, which is thus also incorporated herein by reference.

More particularly, the precursor can be that obtained by (i) modifying the support as described in WO 99/42214, WO 02/07883 and/or WO 03/12008; (ii) impregnating the support as described in EP 0736326; (iii) drying the support as described in WO 00/20116; and (iv) calcining the support as described in WO 01/39882. The resultant precursor can then be reduced or activated as described in PCT/IB2008/051723. Instead, the precursor can be reduced or activated as described in WO 03/035257. These references are hence incorporated herein by reference.

Fischer-Tropsch synthesis typically includes contacting a synthesis gas comprising hydrogen (H$_2$) and carbon monoxide (CO) at an elevated temperature between 180° C. and 250° C. and at an elevated pressure between 10 and 40 bar with the activated cobalt Fischer-Tropsch catalyst, using a slurry phase Fischer-Tropsch reaction of the hydrogen with the carbon monoxide.

The invention will now be described in more detail with reference to the following non-limiting example.

EXAMPLE

A 30 g Co/100 g Al$_2$O$_3$ proprietary slurry phase Fischer-Tropsch synthesis catalyst of the Applicant (hereinafter identified as Catalyst S), was prepared from a particulate supported cobalt-based Fischer-Tropsch synthesis catalyst precursor, which is fully described in WO 01/39882.

A representative batch of such a pre-reduced catalyst precursor was prepared as follows: Puralox SCCa 2/150 (on a particulate alumina support), pore volume of 0.48 ml/g, from SASOL Germany GmbH of Uberseering 40, 22297 Hamburg, Germany was modified with silicon such that the final silicon level was 2.5 Si atoms/nm$^2$ of support. TEOS (tetra ethoxy silane) was added to ethanol, the alumina support (11 ethanol/kg alumina) was added to this solution, and the resultant mixture stirred at 60° C. for 30 minutes. Subsequently the solvent was removed under vacuum with a jacket temperature of the drier equipment of 95° C. The dried modified support was then calcined at 500° C. for 2 hours. A solution of 17.4 kg of Co(NO$_3$)$_2$.6H$_2$O, 9.6 g of (NH$_3$)$_4$Pt(NO$_3$)$_2$, and 11 kg of distilled water was mixed with 20.0 kg of the above mentioned silica modified gamma alumina support by adding the support to the solution. The slurry was added to a conical vacuum drier and continuously mixed. The temperature of this slurry was increased to 60° C. after which a pressure of 20 kPa(a) was applied. During the first 3 hours of the drying step, the temperature was increased slowly and reached 95° C. after 3 hours. After 3 hours the pressure was decreased to 3-15 kPa(a), and a drying rate of 2.5 m %/h at the point of incipient wetness was used. The complete impregnation and drying step took 9 hours, after which the impregnated and dried catalyst support was immediately and directly loaded into a fluidised bed calciner. The temperature of the dried impregnated catalyst support was about 75° C. at the time of loading into the calciner. The loading took about 1 to 2 minutes, and the temperature inside the calciner remained at its set point of about 75° C. The dried impregnated catalyst support was heated from 75° C. to 250° C., using a heating rate of 0.5° C./min and an air space velocity of 1.0 m³$_n$/kg Co(NO$_3$)$_2$.6H$_2$O/h, and kept at 250° C. for 6 hours. To obtain a catalyst with a cobalt loading of 30 g Co/100 g Al$_2$O$_3$, a second impregnation/drying/calcination step was performed. A solution of 9.4 kg of Co(NO$_3$)$_2$.6H$_2$O, 15.7 g of (NH$_3$)$_4$Pt(NO$_3$)$_2$, and 15.1 kg of distilled water was mixed with 20.0 kg of the catalyst precursor from the first impregnation and calcination, by adding the catalyst precursor to the solution. The slurry was added to a conical vacuum drier and continuously mixed. The temperature of this slurry was increased to 60° C. after which a pressure of 20 kPa(a) was applied. During the first 3 hours of the drying step, the temperature was increased slowly and reached 95° C. after 3 hours. After 3 hours the pressure was decreased to 3-15 kPa(a), and a drying rate of 2.5 m %/h at the point of incipient wetness was used. The complete impregnation and drying step took 9 hours, after which the treated catalyst support was immediately and directly loaded into the fluidised bed calciner. The temperature of the dried impregnated catalyst support was about 75° C. at the time of loading into the calciner. The loading took about 1 to 2 minutes, and the temperature inside the calciner remained at its set point of about 75° C. The dried impregnated catalyst was heated from 75° C. to 250° C., using a heating rate of 0.5° C./min and an air space velocity of 1.0 m³$_n$/kg Co(NO$_3$)$_2$.6H$_2$O/h, and kept at 250° C. for 6 hours. A supported cobalt catalyst precursor on an alumina support was thus obtained.

Catalyst S was obtained by reducing the precursor in a fluidized bed reduction unit at atmospheric pressure, utilizing an undiluted H$_2$ reducing gas as total feed gas, whilst applying the following temperature program: heat from 25° C. to 425° C. at 1° C./min, and hold isothermally at 425° C. for 4 hours.

Catalyst S was used in a semi-commercial Fischer-Tropsch synthesis plant in which a synthesis gas comprising hydrogen and carbon monoxide was contacted at an elevated temperature under the following slurry phase Fischer-Tropsch synthesis ('FTS') conditions:

Reactor temperature: 230° C.
Reactor pressure: 21 bar
% (H$_2$+CO) conversion: 60±10
Feed gas composition:
H$_2$: 50-60 vol %
CO: 30-40 vol %
Balance: CH$_4$ and/or CO$_2$ After using this catalyst S in the semi-commercial FTS plant for an extended period of time, it was found that the catalyst was no longer performing adequately, as evidenced thereby that the catalyst FTS activity dropped to below 80% of the initial FTS activity.

A first sample ('A') of the spent catalyst S was subjected to the following laboratory regeneration procedure, which is a comparative procedure:

Dewaxing
10 gms of spent wax coated catalyst sample were subjected to a hydrogenolysis step to remove the wax in a laboratory fixed bed reduction unit with a pure hydrogen space velocity of 1500 ml$_n$/g catalyst/hour, using the following heating program: 1° C./min to 220° C., 2 hours hold at 220° C., 1° C./min to 350° C., 2 hours hold at 350° C., cool down to 25° C. The hydrogen was replaced by argon and the resultant dried powder catalyst unloaded in dry ice (ie CO$_2$), which passivates the catalyst.

Oxidation
The passivated catalyst sample was subsequently subjected to oxidation in a laboratory fluidized bed calcination unit (reaction chamber) using an air space velocity of 1780 ml$_n$/g catalyst/hour and the following heating program: 1° C./min to 250° C., 6 hours hold at 250° C. The unit was maintained at a pressure of 0.9 bar(a) and the oxygen concentration was 21 vol %.

Reduction
The oxidized catalyst sample was subsequently subjected to the following reduction procedure in a fixed bed laboratory reduction unit: hydrogen space velocity of 1500 ml$_n$/g catalyst/hr; heating rate of 1° C./min up to a temperature of 425° C.; held at 425° C. for 16 hours. After cooling down to room temperature (±25° C.) under hydrogen, the reduced (activated) catalyst wax unloaded into wax, prior to re-use.

Two further samples ('B' and 'C') of the spent catalyst S were also subjected to the abovementioned regeneration procedure; however, the oxidation step was effected at 5 bar(a) and 11 bar(a) respectively for these samples. These catalyst samples were thus regenerated in accordance with the present invention.

All three regenerated catalyst examples were tested again for their Fischer-Tropsch synthesis performance in a laboratory micro slurry reactor—see Table 1.

Having applied a reported cobalt based FT kinetic equation, such as:

$$R_{FT} = (k_{FT} p_{H2} p_{CO})/(1+kp_{CO})^2$$

the Arrhenius derived pre-exponential factor of $k_{FT}$ was estimated for the reported runs.

The relative intrinsic specific FT activity is defined as [(pre-exponential factor of catalyst R)/(pre-exponential factor of fresh catalyst)]×100%, with R being catalyst A, B or C.

TABLE 1

| | Number | | |
|---|---|---|---|
| | 222 Euro | 223 Euro | 480 Yen |
| | | Catalyst code | |
| | C | B | A |
| | Invention | Invention | Comparative |
| Synthesis Conditions: | | | |
| Calcined Catalyst mass (g) | 6.6 | 7.0 | 10 |
| Reactor Temp (° C.) | 230 | 230 | 230 |
| Reactor Pressure (bar(a)) | 16 | 16 | 15 |
| Time on stream (h) | 15 | 15 | 15 |
| Synthesis Performance | | | |
| Syngas Conversion (%) | 64 | 59 | 62 |
| FT activity (%) | 98 | 92 | 80 |
| Methane Selectivity (% C atom) | 5.8 | 5.9 | 7.0 |
| % CO of total amount of CO converted to CO$_2$ | 0.0 | 1.3 | 0.5 |

The influence of oxidation at elevated pressures in accordance with the invention, can be seen in the activity recovery, as compared to oxidation at 0.9 bar(a), as set out in Table 2. In other words, as can be seen from Table 2, catalyst activity can be recovered to a greater extent or degree with high pressure oxidation (as part of the catalyst regeneration) in accordance with the invention.

TABLE 2

| Sample | Run | Oxidation pressure (bar(a)) | FTS Activity (%) |
|---|---|---|---|
| A (comparative) | 480 Yen | 0.9 | 80 |
| B | 223 Euro | 5 | 92 |
| C | 222 Euro | 11 | 98 |

It can thus be seen that, by employing high pressure oxidation during regeneration, in accordance with the present invention, it was possible to recover almost completely (92%-98%) the activity of the catalyst.

Furthermore, by using high pressure oxidation during regeneration in accordance with the invention, it is thus possible to recover the activity of the catalyst to a greater extent, without influencing methane selectivity negatively.

It is to be appreciated that the oxidized catalyst sample could instead be regenerated using the 3-stage reduction procedure that catalyst precursor F2 was subjected to in Example 6 of PCT/IB2008/051723 or the 3-stage reduction procedure that catalyst precursor G2 was subjected to in Example 7 of PCT/IB2008/051723.

It is believed that there is carbon present on a spent Fischer-Tropsch synthesis catalyst.

By subjecting the spent catalyst to dewaxing/oxidation/reduction regeneration, and where the oxidation is effected at an elevated pressure in accordance with the invention, it thus appears that it is possible to remove more carbon, leading also to fuller recovery of the activity.

Since it is less expensive to regenerate a spent FTS catalyst than it is to produce fresh catalyst, regeneration of spent FTS catalyst can thus improve process economics, provided that catalyst activity can be recovered to a fuller or greater extent by means of the regeneration, without negatively influencing the methane selectivity.

The invention claimed is:

1. A process for regenerating a spent cobalt Fischer-Tropsch synthesis catalyst, which process includes subjecting a spent particulate cobalt Fischer-Tropsch synthesis catalyst sequentially to a dewaxing treatment to obtain dewaxed catalyst particles, an oxidation treatment in air and at a pressure of 4 to 30 bar(a), and a reduction treatment, thereby regenerating the catalyst.

2. A process according to claim 1, which includes subjecting the catalyst to at least one further regeneration cycle comprising an oxidation treatment at a pressure of 4 to 30 bar(a) followed by a reduction treatment.

3. A process according to claim 1, wherein the dewaxing treatment includes hydrogenolysis; solvent wash or extraction; or solvent wash or extraction followed by hydrogenolysis.

4. A process according to claim 1, which includes, after the dewaxing treatment and before the oxidation treatment, passivating the catalyst.

5. A process according to claim 1, wherein the oxidation treatment comprises subjecting the dewaxed catalyst particles to calcination by fluidizing the catalyst particles in the air at an elevated temperature and at the elevated pressure of from 4 to 30 bar(a), thereby to oxidize the catalyst particles.

6. A process according to claim 5, wherein the fluidization of the dewaxed catalyst particles is effected in a reaction chamber which is at the elevated pressure, with the calcination including heating the catalyst particles up to a temperature T and holding the catalyst particles at the temperature T for a period of time.

7. A process according to claim 6, wherein the space velocity through the reaction chamber during the fluidization is in the range of 100 to 20000 $ml_n$/g catalyst/hour.

8. A process according to claim 6, wherein the catalyst particles are heated up to the temperature T at a rate of 0.1 to 10° C./min.

9. A process according to claim 6, wherein the temperature T is in the range of 150° C. to 400° C.

10. A process according to claim 6, wherein the period of time that the catalyst particles are held at the temperature T° C., is in the range of 0.1 hour to 24 hours.

11. A process according to claim 1, wherein the elevated pressure at which the oxidation is effected is 4 to 12 bar(a).

12. A process according to claim 1, wherein the reduction treatment comprises treating the oxidized catalyst particles with a hydrogen-containing reducing gas at an elevated temperature and at a pressure P where P≥0.8 bar(a).

* * * * *